United States Patent
Itskovich et al.

(10) Patent No.: US 8,035,392 B2
(45) Date of Patent: Oct. 11, 2011

(54) METHOD AND APPARATUS FOR WHILE-DRILLING TRANSIENT RESISTIVITY MEASUREMENTS

(75) Inventors: Gregory B. Itskovich, Houston, TX (US); Arcady Reiderman, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 540 days.

(21) Appl. No.: 12/288,225

(22) Filed: Oct. 17, 2008

(65) Prior Publication Data

US 2010/0097065 A1    Apr. 22, 2010

(51) Int. Cl.
*G01V 3/00* (2006.01)
*G01V 3/08* (2006.01)
*G01V 3/12* (2006.01)

(52) U.S. Cl. ........ 324/339; 324/332; 324/334; 324/344; 324/336

(58) Field of Classification Search .................. None
See application file for complete search history.

(56) References Cited

U.S. PATENT DOCUMENTS

| | | | |
|---|---|---|---|
| 4,536,714 A | | 8/1985 | Clark |
| 5,574,374 A | * | 11/1996 | Thompson et al. ........... 324/338 |
| 5,814,988 A | * | 9/1998 | Itskovich et al. ............. 324/303 |
| 5,939,885 A | | 8/1999 | McClure et al. |
| 6,191,586 B1 | | 2/2001 | Bittar |
| 6,714,014 B2 | | 3/2004 | Evans et al. |
| 6,885,308 B2 | * | 4/2005 | Smith et al. ................. 340/854.6 |
| 6,906,521 B2 | | 6/2005 | Tabarovsky |
| 7,027,922 B2 | | 4/2006 | Bespalov et al. |
| 7,046,009 B2 | | 5/2006 | Itskovich |
| 7,150,316 B2 | | 12/2006 | Itskovich |
| 7,167,006 B2 | | 1/2007 | Itskovich |
| 7,525,315 B2 | * | 4/2009 | Fredette et al. ............... 324/342 |
| 2004/0183538 A1 | * | 9/2004 | Hanstein et al. .............. 324/339 |
| 2006/0017443 A1 | * | 1/2006 | Folberth et al. .............. 324/338 |
| 2006/0061364 A1 | | 3/2006 | Banning et al. |
| 2007/0108981 A1 | * | 5/2007 | Banning-Geertsma et al. ......................... 324/338 |
| 2007/0216416 A1 | | 9/2007 | Itskovich |

* cited by examiner

*Primary Examiner* — Paresh Patel
(74) *Attorney, Agent, or Firm* — Mossman Kumar & Tyler PC

(57) ABSTRACT

Structure for deep MWD resistivity measurements suitable for both geo-steering and measurements ahead of the drill bit is disclosed. The structure is capable of extracting information about resistivity of formation in the presence of conductive drill. In one embodiment, ahead-of-bit sensing is achieved via transient electromagnetic measurements when current is switched off in the transmitter loop and the transient signal is measured in the receiver loops placed at some distances from the receiver. To reduce a parasitic effect of the currents in the drill three-coil bucking system with magnetic nonconductive shield in combination with a highly conductive copper shield are applied. Specifically, a short (less than 1 m) copper cover and short (less than 0.2 m) ferrite cover are placed in the vicinity of transmitting and receiving coils. A bucking operation followed by an inversion is performed on received signals to obtain data reflecting parameters of the surrounding subsurface formations.

9 Claims, 7 Drawing Sheets

METHOD AND APPARATUS FOR WHILE-DRILLING TRANSIENT RESISTIVITY MEASUREMENTS

FIELD OF THE INVENTION

The present invention relates generally to measurement tools used in hydrocarbon exploration and production, and more particularly to a measuring-while-drilling (MWD) tool for electromagnetic induction well logging

BACKGROUND OF THE INVENTION

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

At the ultra-deep scale, technology may be employed based on transient field behavior. The transient electromagnetic field method is widely used in surface geophysics. Examples of transient technology are seen, for example, in Kaufman et al., 1983, "Frequency and transient soundings", Elsevier Science.; Sidorov et al., 1969, "Geophysical surveys with near zone transient EM." published by NVIGG, Saratov, Russia; and Rabinovich et al., 1981, "Formation of an immersed vertical magnetic dipole field": J. Geologiya I Geofizika, N 3. Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter (see Kaufman et al., 1983). This transient field is especially important for logging. Use of a symmetric logging tool using transient field measurements for formation detection is discussed, for example, in U.S. Pat. No. 5,530,359, issued to Habashy et al.

U.S. Pat. No. 5,955,884, issued to Payton et al. discusses methods for measuring transient electromagnetic fields in rock formations. Electromagnetic energy is applied to the formation at selected frequencies and waveforms that maximize the radial depth of penetration of the magnetic and electric energy. Payton comprises at least one electromagnetic transmitter and at least one electric transmitter for applying electric energy. The transmitter may be either a single-axis or multi-axis electromagnetic and/or electric transmitter. In one embodiment the TEM transmitters and TEM receivers are separate modules that are spaced apart and interconnected by lengths of cable, with the TEM transmitter and TEM receiver modules being separated by an interval of from one meter up to 200 meters, as selected. Radial depth of investigation is related to the skin depth, $\delta=\sqrt{2/\sigma\mu\omega}$, which in turn is related to frequency. Lower frequency signals can increase the skin depth. Similarly, the conductivity of the surrounding material inversely affects the skin depth. As conductivity increases, the depth of investigation decreases. Finite conductivity casing of the apparatus therefore can reduce the depth of investigation.

State-of-the-art measurement-while-drilling (MWD) technology introduces a new, deep (3-10 meters) scale for an electromagnetic logging application related to well navigation in thick reservoirs. One problem associated with the MWD environment is the presence of the metal (imperfectly conductive) drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver (as discussed in U.S. Pat. No. 6,188,222 B1, issued to Seydoux et al.). The sensitivity of such a tool to remote boundaries is low. Currently, Stolar Horizon, Inc. is developing drill string radar, DSR, for CBM (Coal Bed Methane) wells. DSR provides 3-D imaging within a close range of the wellbore.

Currently, induction tools operate to obtain measurements in the presence of a primary field. In measurement-while-drilling method, examples of such techniques are the Multiple Propagation Resistivity (MPR) device, and the High-Definition Induction Logging (HDIL) device for open hole. One or more transmitters disposed along a drill tool act as a primary source of induction and signals are received from the formation at receiver coils placed at an axial distance from the transmitters along the drill tool. A disadvantage of both MPR and HDIL methods is that the primary source of induction from the transmitter is always present during the time frame in which the receivers are obtaining measurements from the formation, thereby distorting the intended signal. This can be solved by using pulse excitations such as is done in a transient induction tool where signals are measured during time intervals between excitation pulses.

In a typical transient induction tool, current in the transmitter coil drops from its initial value $I_0$ to 0 at the moment t=0. Subsequent measurements are taken while the rotating tool is moving along the borehole trajectory. The currents induced in the drilling pipe and in the formation (i.e. eddy currents) begin diffusing from the region close to the transmitter coil in all the directions surrounding the transmitter. These currents induce electromagnetic field components which can be measured by induction coils placed along the conductive pipe. Signal contributions due to the eddy currents in the pipe are considered to be parasitic since the signal due to these currents is much stronger than the signal from the formation. In order to receive a signal which is substantially unaffected by the eddy currents in the pipe, one can measure the signal at the very late stage, at a time in which the signals from the formation dominate parasitic signals due to the pipe. Although the formation signal dominates at the late stage, it is also very small, and reliable measurement can be difficult. In prior methods, increasing the distance between transmitter and receivers reduces the influence of the pipe and shifts dominant contribution of the formation to the earlier time range. Besides having limited resolution with respect to an oil/water boundary, such a system is very long (up to 10-15 m) which is not desirable and convenient for an MWD tool.

In conventional HDIL situations, a fixed "wound-counter-wound" turn ratio between two receiver electrodes R1 and R2 may be used. It is generally understood that such an arrangement advantageously achieves the objective of reporting a zero signal in the absence of anything but air proximate to the measurement tool. Typically, any residual signal that might be present due to particular implementation details may be calibrated out of the system by performing air-hang calibration.

It is also known to conduct logging-while-drilling (LWD) operations using multiple frequencies. Conventionally, a wound-counter-wound configuration preferably has a turn ratio (the number of loops in respective receiver coils) that is adjusted to achieve substantially zero signal during air-hang calibration. This calibration suffices for a single frequency, and any residual non-zero signals are characterized mathematically and subtracted out using digital processing techniques. All residual non-zero signals throughout a range of frequencies can be calibrated with an "air hang."

There are several factors that make it difficult to perform both geo-steering and ahead of the bit induction measurements while drilling. One factor is the conductive drill string (metal pipe) which has a finite, non-zero conductivity. The measured transient induction signal is severely affected by the eddy currents in the pipe, limiting resolution of the measurements to the formation parameters, specifically, to a water-oil boundary in case of geo-steering. By increasing a distance between transmitter and receiver it is possible to reduce the influence of the drill while increasing contribution into the signal from the formation. Besides having a limited resolution with respect to the parameters of interest such system might be too long (up to 10-15 m) for MWD applications.

In case of the measurements ahead of the bit positioning of the induction system with respect to the drill bit represents a second complicating factor. Indeed, the first 3-4 meters in the vicinity of the drill bit are not allowed for the transmitter/receiver coils' placement since this space is occupied by the equipment supporting the drilling process. In case of the system looking about 5 m ahead of the bit, the transmitter/receiver system would be separated from the region of interest by 8-9 m distance. Unfortunately, none of the existing resistivity tools have such depth of investigation.

The above mentioned circumstances emphasize an importance of deep-looking and relatively short EM (electromagnetic) system applicable for both geo-steering and ahead of the bit measurements while drilling.

Efforts to alleviate known problems with the presence of a conductive drillpipe in regions where transient EM sensing operations are taking place have been proposed in the prior art.

U.S. published patent application no 2007/0216416, filed on behalf of Gregory B. Itskovich on Mar. 6, 2007 and entitled "Combination of Electromagnetic and Magneto-static Shields to Perform Measurements Ahead of the Drill Bit" ("the Itskovich '416 application") discloses one approach for ahead-of-bit measurements. The Itskovich '416 application is commonly assigned to the assignee of the present invention and is hereby incorporated by reference herein in its entirety. Transient MWD resistivity measurement systems are further disclosed in U.S. Pat. Nos. 7,167,006; 7,150,316; 7,046,009 commonly assigned to the assignee of the present invention. The foregoing references describe different techniques allowing for performing transient electromagnetic measurements in the presence of conductive support (pipe). All the disclosed techniques require relatively long (several meters) segments of copper shielding and long (several meters) segments of ferrite shielding to be placed substantially between the transmitter and receiver coils. Indeed, experimental results suggest that such shielding approaches may not be entirely practical from a mechanical standpoint due to the requisite lengths of shielding.

SUMMARY OF THE INVENTION

One embodiment of the present invention is an apparatus for evaluating an earth formation. The apparatus includes a downhole assembly conveyed in a borehole in the earth formation. The downhole assembly may include a member, such as a mandrel, having a finite, non-zero conductivity. A transmitter associated with the downhole assembly produces a first transient electromagnetic signal in the earth formation. A receiver receives a second transient electromagnetic signal resulting from interaction of the first transient electromagnetic signal with the earth formation, the receiver being spaced apart from the transmitter.

In one embodiment, an electromagnetic shield associated with the downhole assembly reduces an effect on the second transient electromagnetic signal of substantially direct coupling between the transmitter and the receiver. A magnetostatic shield associated with the downhole assembly reduces an effect on the second transient electromagnetic signal of currents induced in the downhole assembly by the first transient electromagnetic signal. The downhole assembly may include a bottomhole assembly conveyed on a drilling tubular. The magnetostatic shield may include a ferrite coating and/or a cut on the drilling tubular. The electromagnetic shield may comprise a highly conductive material. The apparatus may further include a processor configured to estimate from the second transient signal a distance to an interface in the earth formation and record the estimated distance on a suitable storage medium. A processor may further be configured to use reference signal in the estimation of the distance. The processor may be further configured control a direction of drilling of a bottomhole assembly. The transmitter may include a coil that is oriented with its axis that is substantially parallel to a longitudinal axis of the downhole assembly and/or substantially orthogonal to a longitudinal axis of the downhole assembly. The receiver may include a coil that is oriented with its axis substantially parallel to a longitudinal axis of the downhole assembly and/or substantially orthogonal to a longitudinal axis of a downhole assembly. The downhole assembly may include a member having a finite, non-zero conductivity.

Another embodiment of the invention is a method of evaluating an earth formation. The method includes conveying a downhole assembly into a borehole in the earth formation. A first transient electromagnetic signal is produced in the earth formation using a transmitter. A second transient electromagnetic signal resulting from interaction of the first transient electromagnetic signal with the earth formation is received by a receiver spaced apart from the transmitter. The receiver is electromagnetically shielded from substantially direct coupling with the transmitter. The receiver is also magnetostatically shielded from effects of currents induced in the downhole assembly by the first transient electromagnetic signal. The method may further include conveying a downhole assembly using a wireline and/or a drilling tubular. Magnetostatically shielding the receiver may further include providing a ferrite coating and/or a cut on a drilling tubular. Electromagnetically shielding the receiver may further include using a highly conductive material. The method may further include obtaining a reference signal with the downhole assembly suspended in air, and using the reference signal in estimating the distance. The estimated distance may be further use to control a direction of drilling of a bottomhole assembly. The estimated distance may be used in further operations.

Another embodiment of the invention is a computer-readable medium for use with an apparatus for evaluating an earth formation. The apparatus includes a transmitter and a receiver associated with a bottomhole assembly configured to be conveyed into a borehole in the earth formation. The transmitter is configured to generate a first transient electromagnetic signal in the earth formation. The receiver is configured to receive a second transient electromagnetic signal resulting from interaction of the first transient electromagnetic signal with the earth formation. The apparatus also includes an electromagnetic shield and a magnetostatic shield. The medium includes instructions that enable a processor to estimate a distance to an interface in the earth formation using the second transient electromagnetic signal. The medium may include a ROM, an EPROM, an EAROMs, a flash memory, and/or an optical disk.

In accordance with one feature of the invention, in order to reduce the length of both magnetic and conductive shielding necessary to overcome the parasitic effects of conductive drillpipe in the vicinity of transient EMF measurements, it is proposed to utilize a three-coil "bucked" transient system in combination with a short magneto-static shield and short electromagnetic shield placed in the vicinity of the coils.

BRIEF DESCRIPTION OF THE DRAWINGS

The present invention is best understood with reference to the attached drawings in which like numerals refer to like elements, and in which.

DETAILED DESCRIPTION OF A PREFERRED EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time-consuming, outside the knowledge base of typical laymen, but would nevertheless be a routine undertaking for those of ordinary skill in the relevant fields.

Figure 1:
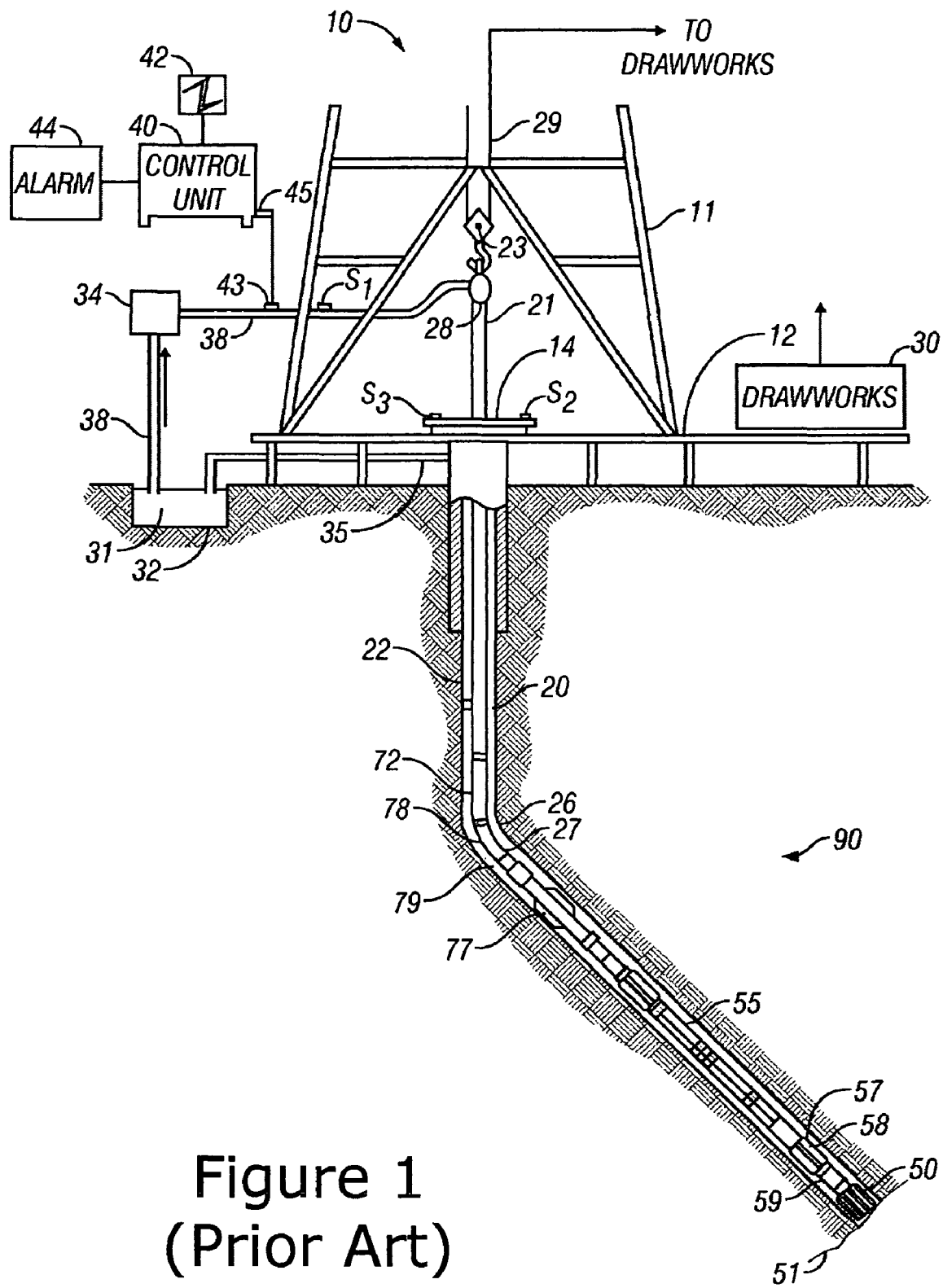
FIG. 1 is a functional diagram of a drilling rig including a bottomhole assembly for performing transient measurement-while-drilling (MWD) resistivity measurement in accordance with one embodiment of the invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes tubing such as a drill pipe 22 or coiled tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor S3 associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling 1s assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$ $S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
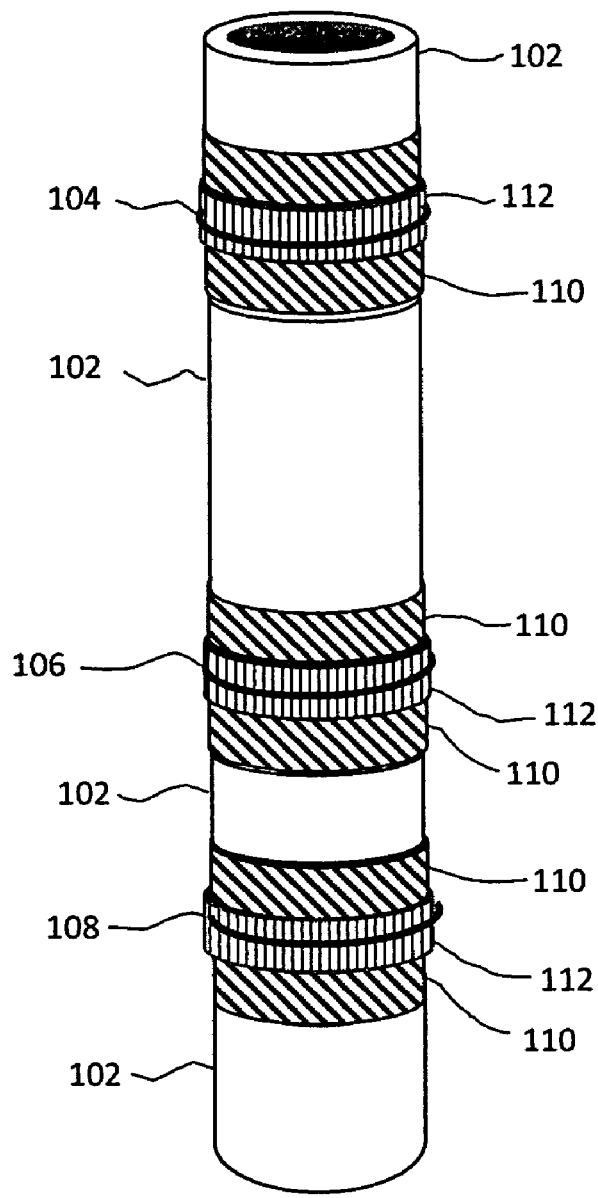
FIG. 2 shows a schematic of a MWD tool in accordance with one embodiment of the invention and its trajectory in a horizontal well.
Figure 2:

Referring to FIG. 2, there is shown a perspective view of a MWD tool 100 in accordance with one embodiment of the invention and its relation to an ahead-of-boundary 114 between regions of dissimilar resistivity. As shown in FIG. 1, tool 100 comprises a drill collar 102 carrying a transmitter coil 104 and a pair of receiver coils 106 and 108 in a spaced-apart relationship with transmitter coil 102. In one embodiment, receiver coil 106 is spaced approximately 2 meters from transmitter coil 102 and receiver coil 108 is spaced approximately 4 meters from transmitter coil.

The drill collar is further provided with a plurality of localized, conductive electromagnetic shielding regions 110, each region 110 being centered around either the transmitter coil 104 or each of the receiver coils 106 and 108. In the disclosed embodiment, the electromagnetic shielding is in the form of a plurality of localized, highly conductive copper coated regions 110 in selected locations as shown in FIG. 2. Coated regions 110 reduce the effects of direct coupling between transmitter coil 104 and receiver coils 106 and 108. In accordance with one aspect of the invention, separate, localized shielded regions are utilized, rather than a single, unitary shielded regions encompassing all of the transmitter and receiver coils, as is proposed in prior art arrangements such as that of the Itskovich '416 application. In accordance with one aspect of the invention, copper shielding regions 110 are short, i.e., less than one meter; in a preferred embodiment, regions 110 are 0.75 m in length.

The drill collar is further provided with a plurality of localized non-conductive magnetic shielding regions 112, similarly centered on either the transmitter coil 104 or each of the receiver coils 106 and 108. Localized coated regions 112, which may comprise a coating of a non-conductive ferrite, serve as magnetostatic shielding for the tool. That is, ferrite coatings 112 reduce the effects of eddy currents induced in the drill collar 102. In contrast to prior art arrangements in which a rather long, unitary coated region is provided extending over a length of the tool including all transmitter and receiver coils, the arrangement in accordance with the presently disclosed embodiment utilizes a plurality of separate and much smaller, localized coated regions 112 each associated with a transmitter or receiver coil. In the presently disclosed embodiment, reach region 112 is approximately 0.1 m long, centered on the respective coils. This is on the order of ten times smaller than the magnetostatic shielding proposed in prior art devices, such as for example, that of the aforementioned Itskovich '416 application.

In accordance with one advantageous aspect of the invention, the electromagnetic and magnetostatic shielding for tool 100 is limited to localized regions directly in the respective vicinities of transmitter coil 104 and receiver coils 106 and 108. As noted, this is in contrast to the arrangement disclosed in many prior art arrangements, including the above-referenced Itskovich '416 application, wherein the suggested size of the unitary copper electromagnetic shielding was on the order of 8 meters and the suggested size of the unitary ferrite magnetostatic shielding was on the order of 3 meters. As previously noted, this unitary arrangement suffers from the disadvantage of requiring the tool to be excessively long, whereas the substantially shorter (on the order of ¹/₁₀ th size) shielding regions in the embodiment of FIG. 2 do not significantly increase the size of the tool.

In operation, current in the transmitter coil 104 vanishes from initial value $I_0$ to 0 at the moment t=0. The measurements at receiver coils 106 and 108 are taken while the rotating tool is moving along the borehole trajectory. The induced in the drilling pipe and formation currents (eddy currents) begin diffusion from the region close to the transmitter coil 104 in all the directions surrounding the transmitter. The induced in the formation and in the drilling pipe currents induce the electromagnetic field which is measured by the induction coil.

Contribution due to the eddy currents in the pipe is considered as a parasitic one since at the time interval where parameters of the interest manifest themselves the signal due to currents in the pipe are stronger than the signal from the formation. In order to receive the signal, which is substantially unaffected by the eddy currents in the pipe, one should measure signal at the very late stage in time when signal from the formation dominates compared to the signal from the pipe. The weakness of this approach is that the signal from the formation at a such late stage is very small and can't be reliably measured. By increasing distance between transmitter and receivers we can reduce the influence of the pipe and shift dominant contribution of the formation to the earlier time range. As noted, however, besides having limited resolution with respect to the bed resistivity boundary, such a system is very long (up to 10-15 m) which is not desirable for the MWD tool.

Magneto-static shielding 112 utilizing a nonconductive material such as ferrite reduces the intensity of the eddy currents in the pipe and, as a result, diminishes the parasitic effect from the pipe. A purely magneto-static shielding requires a long (~several meters) ferrite cover of high (~1000) permeability. From mechanical point of view an application of such long shield along the metallic drill might be impractical. To reduce the length of the magnetic material the present invention utilizes a short magneto-static shield 112 in combination with a short electromagnetic shield 110, both placed in the vicinity of the transmitter/receivers.

In accordance with one aspect of the invention, additional reduction of the shielding length is accomplished by performing a bucking of the signal from the drill. By combining short magneto-static shield 112 with short electromagnetic shield 110 in the three coils bucked system we achieve several objectives:

a) Substantially reduce the eddy currents in the portion of the metal pipe covered by the magnetic material.

b) Substantially reduce the contribution of the eddy currents induced in the copper shield relative to the contribution of the eddy currents induced in the formation into the measured signal. This preserves resolution of the transient signal to the remote resistivity boundaries.

c) Substantially improve quality of the conductive drill bucking (thanks to (a) and (b) ). This improvement is manifested as reduced impact of the drill on the signal from formation.

d) Significant boost of the effective transmitter/receiver moment thanks to the application for magnetic material used for shielding.

Figure 3:
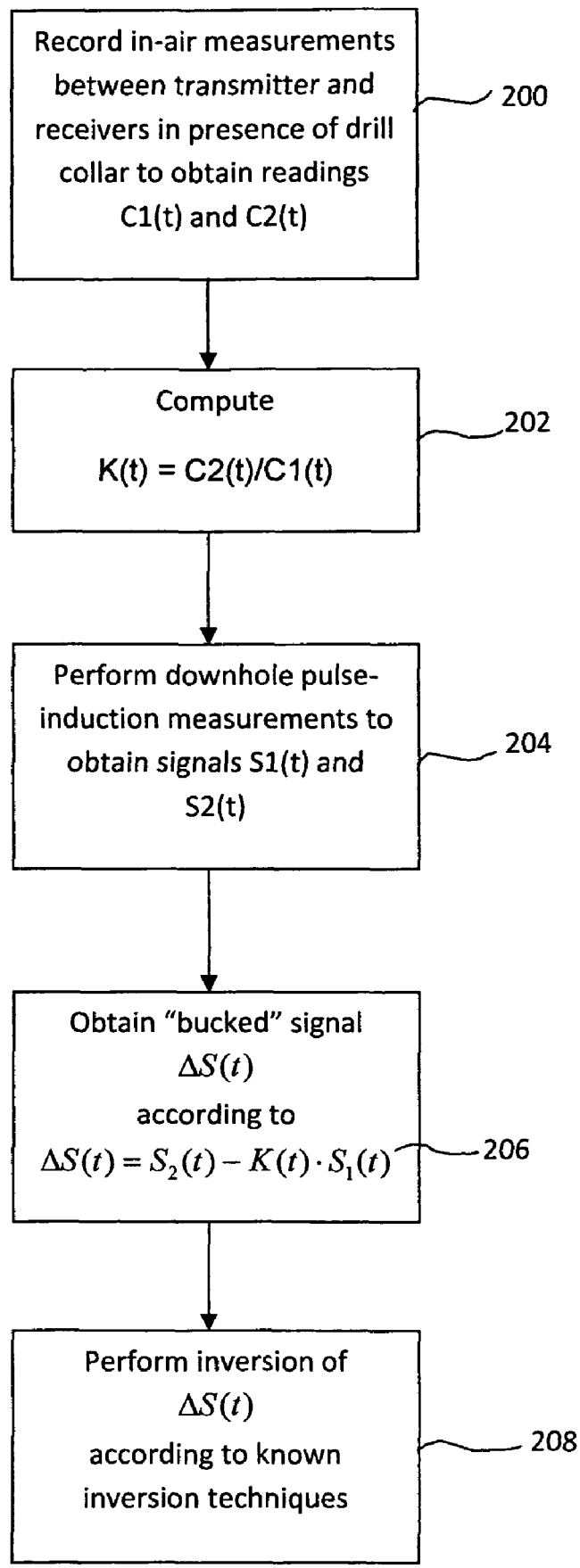
FIG. 3 is a flow diagram illustrating steps in the process of calibrating and performing MWD transient resistivity measurements in accordance with one embodiment of the invention.

The system operates as depicted in the flow diagram of FIG. 3.

Figure 4:
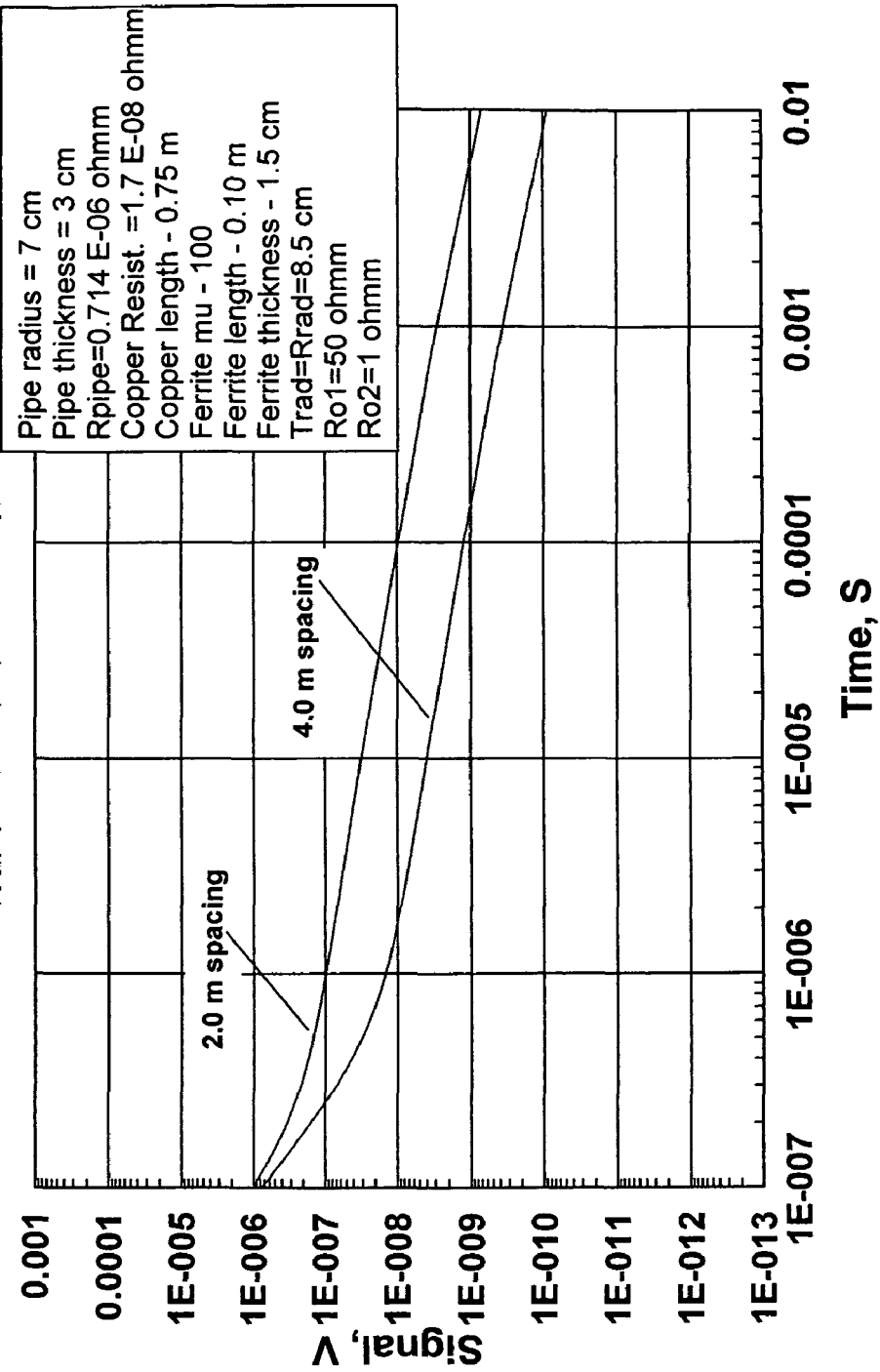
FIG. 4 is a plot of received signals versus time appearing at the respective receiver coils from the tool from FIG. 2 during a calibration (bucking) operation.

1. First, in block 200, perform pulse induction measurements in the presence of only the pipe and two receivers R1 and R2, i.e., with the tool in air. The two received signals are referred to as $C_1(t)$ and $C_2(t)$. Curves $C_1(t)$ and $C_2(t)$ are depicted in the plot of FIG. 4.

Figure 5:
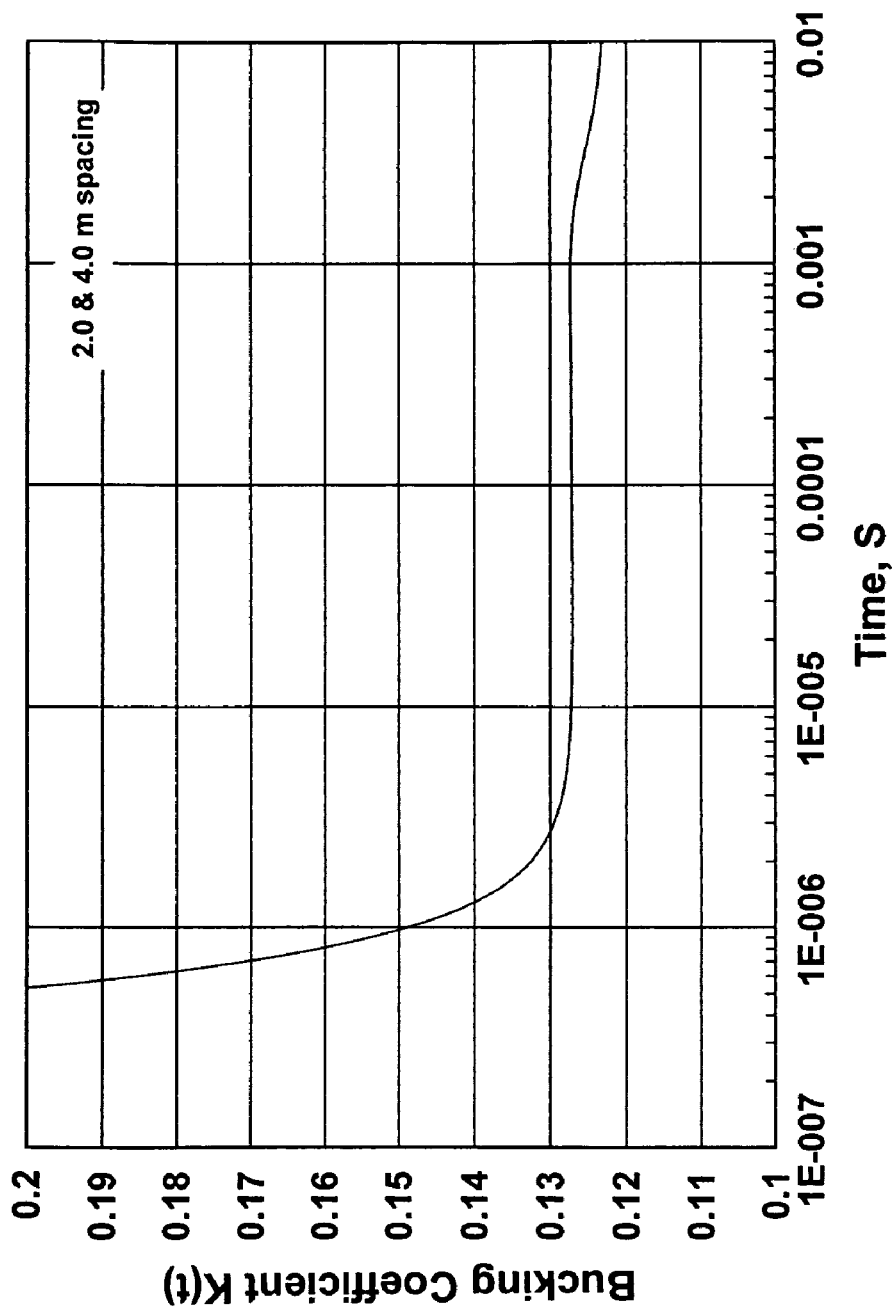
FIG. 5 is a plot of a bucking curve derived from the signals shown in FIG. 4.

2. Next, in block 202, a time-dependent coefficient K(t) is calculated according to $K(t)=C_2(t)/C_2(t)$. The first and second steps 200 and 202 constitute a bucking mode. FIG. 5 is a plot of K(t) derived from the curves from FIG. 4.

Figure 6:
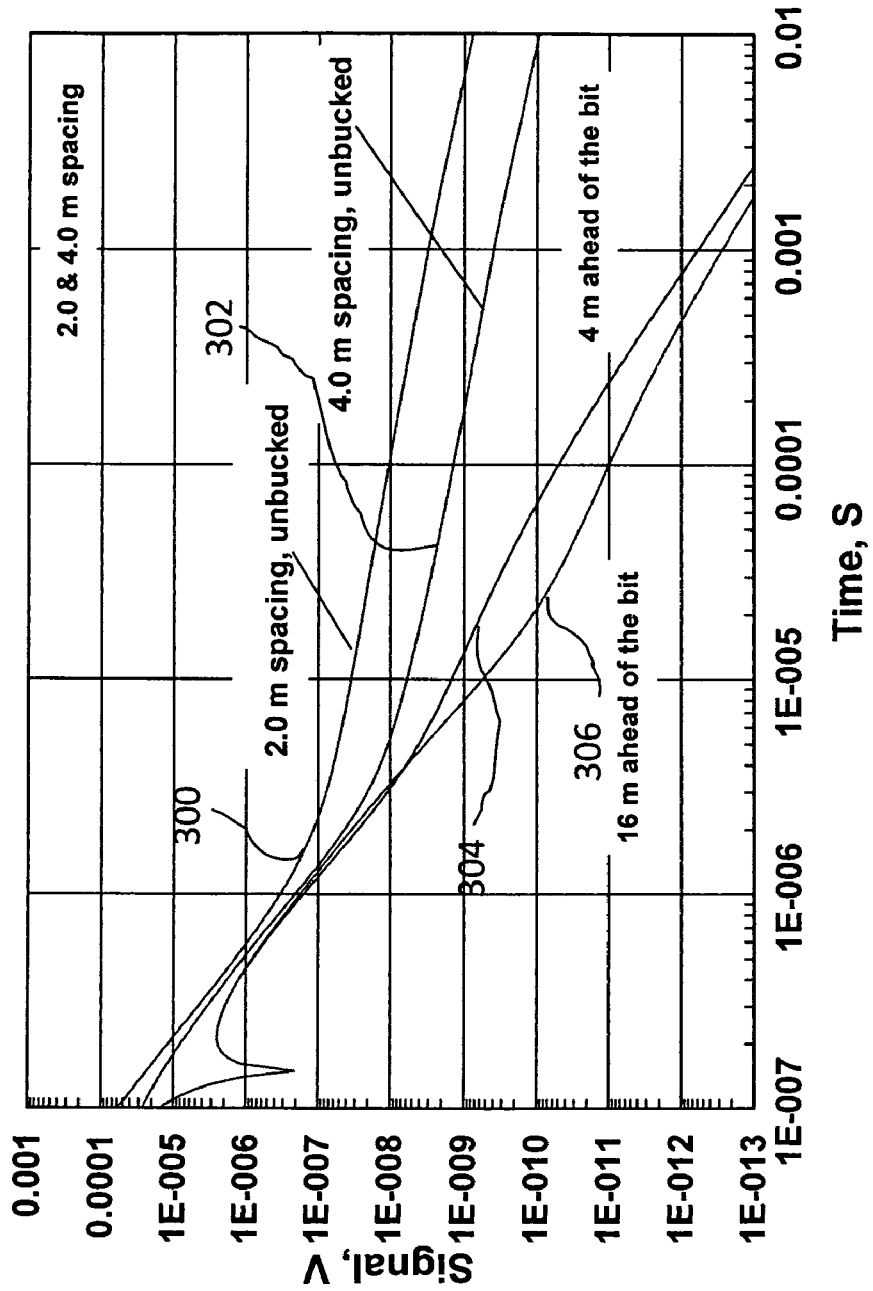
FIG. 6 is a plot of bucked curves corresponding to the received signals on the respective receiver coils on the tool in FIG. 2.

3. Next, in block 204, take downhole pulse induction measurements and acquire two signals $S_1(t)$ and $S_2(t)$. These signals $S_1(t)$ and $S_2(t)$ are shown in the plot of FIG. 6.

4. Following, in block 206, combine two signals S1(t) and S2(t) to estimate differential (bucked) signal ΔS(t) according to the equation:

$$\Delta S(t) = S_2(t) - K(t) \cdot S_1(t)$$

Steps 204 and 206 constitute the main operational mode of tool 100.

5. Finally, at block 208, perform inversion of the differential (bucked) signal ΔS(t) which is substantially unaffected by drill collar 102, to find parameters of the surrounding formation (for example a distance to water-oil contact (geo-steering) or ahead of the drill formation). This inversion step 208 can be performed according to any of the well-known inversion techniques, as would be apparent to those of ordinary skill in the art. The plot of FIG. 6 shows curves derived in accordance with the present invention corresponding to 4 meters and 6 meters ahead of the drill bit.

In FIG. 6, the plot designated with reference numeral 300 corresponds to the unbucked signal measured at the receiver 106 spaced 2 meters from the transmitter 104, when it is assumed for the purposes of modeling that the water/oil boundary 114 is spaced 4 meters ahead of the bit 100. Similarly the curve 302 corresponds to the unbucked signal measured at receiver 108 spaced 4 meters from the transmitter 104, assuming the boundary 114 is 4 meters ahead of the bit.

The curve 304 in FIG. 6 is derived from curves 300 and 302 according to the relation $\Delta S(t)=S_2(t)-K(t) \cdot S_1(t)$, as described above. Curve 306 in FIG. 6 is similarly derived, but for the case when the ahead-of-bit boundary 114 is assumed to be 16 meters away from the bit. (The two curves from which curve 306 is derived—where the boundary 114 is assumed to be 16 meters ahead of the bit—are substantially identical to curves 300 and 302 in FIG. 6. Therefore, these 16-meter boundary curves overlap with the 4-meter boundary curves 300 and 302, such that FIG. 6 actually depicts six curves, not four.)

Figure 7:
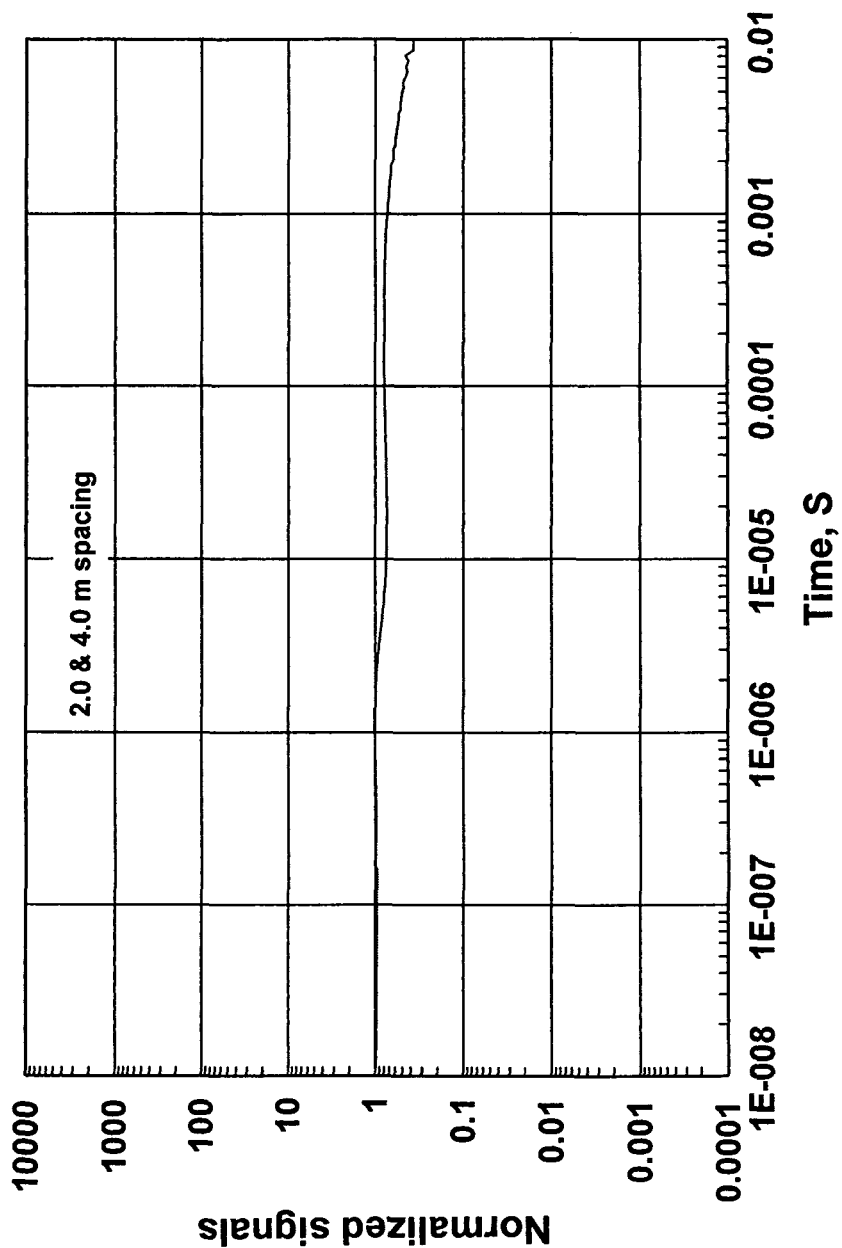
FIG. 7 is a plot comparing normalized responses of the tool from FIG. 2 utilizing the process of the present invention.

FIG. 7 is a plot comparing the normalized responses for 2 meter and 4 meter spacing with 10-centimeter ferrite shielding versus the no-pipe model, with the distance to the ahead-of-the-bit boundary being 4 meters. To derive the curve of FIG. 7, first the curve 304 corresponding to a 4-meter boundary spacing is divided by a curve corresponding to a bucked signal within the same formation model (4-meter boundary spacing) in the absence of the drillpipe and drillbit. Thus, the ratio between curve 304 and 1s the latter buck signal, no drillpipe curve (not shown) indicates the extent to which curve 304 is affected by the pipe. Since the curve of FIG. 7 shows a ratio of approximately 1:1, this indicates that the invention is capable of eliminating the contribution from the presence of the pipe, while preserving information about the formation. As shown in FIG. 7, during the time interval less than 0.001 sec, the ratio is very close to 1:1, indicating that the objective of eliminating the parasitic effects of the drillpipe is achieved through the practice of the present invention.

The mathematical modeling of FIGS. 4 through 7 herein is provided to illustrate the effectiveness of the approach in accordance with the disclosed embodiment, in the case of a transient system placed in a vertical well in a two-layered formation, such as depicted in FIG. 2. Tool 100 is placed in the resistive upper half-space 116 of, for example, 50 ohmm, with a boundary 114 between this space and the ahead-of-the-bit space 118, having a resistivity of, for example, 1 ohm·m. The boundary 114 is presumed to be at some distance (4-16 meters) below the drill bit. The parameters of the model used in the modeling are the following:

Pipe radius=7 cm
Pipe thickness=3 cm
Resistivity of drill=0.714 E-06 ohmm
Resistivity of copper=1.7 E-08 ohmm
Copper length—0.75 m
Ferrite magnetic permeability=100
Ferrite length—0.10 m
Ferrite thickness—1.5 cm
Transmitter/Receiver coils radius=8.5 cm
Resistivity of resistive layer Ro1=50 ohmm
Resistivity of conductive layer Ro2=1 ohmm From the foregoing disclosure, it should be apparent that a tool for transient MWD electromagnetic (resistivity) measurements has been disclosed. Tools in accordance with the invention have been shown to be achieve accurate results even though relatively short shielding (electromagnetic and magnetostatic) is provided. In one embodiment, the tool utilizes a bucking technique to process measured signals prior to inversion.

Those of ordinary skill in the art will recognize that the present invention may be advantageously practiced in conjunction with anyone of a multitude of known logging devices, including, for example, the device disclosed in the aforementioned Itskovich '416 application. Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants-and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention as defined in the following claims.

What is claimed is:

1. An apparatus for use in a borehole in an earth formation, comprising:
   a conducting tubular;
   at least one transmitter on said conducting tubular for propagating an electromagnetic field in the earth formation;
   at least one receiver on said conducting tubular for receiving a transient signal resulting from interaction of said electromagnetic field with said earth formation;
   each of said at least one transmitter and said at least one receiver having a separate localized magnetostatic shielded region associated therewith;
   each of said at least one transmitter and said at least one receiver having a separate localized electromagnetic shielded region associated therewith; and
   processing circuitry for determining a bucking coefficient and for determining from said transient signal and said bucking coefficient a resistivity measurement of said earth formation,
   wherein said bucking coefficient K(t) is computed according to $$K(t)=C_1(t)/C_2(t)$$

where $C_1(t)$ and $C_2(t)$ comprise signals received at said at least one receiver in response to transmission of an electromagnetic pulse from said at least one transmitter while said apparatus is outside of said earth formation.

2. An apparatus in accordance with claim 1, wherein said resistivity measurement ΔS(t) is computed according to $$\Delta S(t)=S_2(t)-K(t)\cdot S_1(t)$$

where $S_1(t)$ and $S_2(t)$ are signals received at said at least one receiver in response to transmission of an electromagnetic pulse from said at least one transmitter while said apparatus is within said earth formation.

3. An apparatus in accordance with claim 1, wherein each separate localized magnetostatic shielded region comprises a coating of non-conductive material.

4. An apparatus in accordance with claim 3, wherein each separate localized electromagnetic shielded region comprises a coating of a highly conductive material.

5. An apparatus in accordance with claim 4, wherein said non-conductive material is ferrite.

6. An apparatus in accordance with claim 5, wherein said highly conductive material is copper.

7. A method of performing pulse induction measurements within an earth formation, comprising:
   (a) recording in-air measurements between a transmitter and first and second receivers disposed on a conductive tubular to obtain first and second signals $C_1(t)$ and $C_2(t)$
   (b) calculating a bucking coefficient K(t) according to $$K(t)=C_1(t)/C_2(t)$$

(c) recording in-formation measurements between said transmitter and said first and second receivers to obtain signals $S_1(t)$ and $S_2(t)$; and
   (d) computing a bucked resistivity measurement ΔS(t) according to $$\Delta S(t)=S_2(t)-K(t)\cdot S_1(t).$$

8. A method in accordance with claim 7, further comprising:
   providing separate localized magnetostatic and electromagnetic shielding for each of said transmitter and said first and second receivers.

9. A method for performing pulse induction measurements in an earth formation, comprising:
   providing a tubular having a transmitter and first and second receivers disposed thereon in a spaced apart relationship;
   for each of said transmitter and said first and second receivers, providing separate, localized magnetostatic and electromagnetic shielding;
   performing an in-air calibration operation involving transmission of an electromagnetic pulse from said transmitter and receiving resulting signals at each of said first and second receivers;
   inserting said tubular into said earth formation;
   performing a pulse induction operation in said earth formation involving transmission of an electromagnetic pulse from said transmitter and receiving resulting signals at each of said first and second receivers; processing said resulting signals at each of said first and second receivers based upon the results of said calibration operation.

* * * * *